(12) United States Patent
Kapinos et al.

(10) Patent No.: US 11,397,474 B1
(45) Date of Patent: Jul. 26, 2022

(54) WIRELESS PERIPHERAL CONNECTION

(71) Applicant: LENOVO (Singapore) PTE. LTD., New Tech Park (SG)

(72) Inventors: Robert J. Kapinos, Durham, NC (US); Jennifer Jyi Shue, Cary, NC (US); Michael T. Matthews, Cary, NC (US); Alfredo Zugasti, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 17/200,356

(22) Filed: Mar. 12, 2021

(51) Int. Cl.
*G06F 3/023* (2006.01)
*H04N 21/4363* (2011.01)

(52) U.S. Cl.
CPC ....... *G06F 3/023* (2013.01); *H04N 21/43637* (2013.01)

(58) Field of Classification Search
CPC .......................... G06F 3/023; H04N 21/43637
See application file for complete search history.

(56) References Cited

U.S. PATENT DOCUMENTS

| | | | |
|---|---|---|---|
| 6,609,034 B1* | 8/2003 | Behrens ................. | G06F 3/023 361/679.1 |
| 2005/0204026 A1* | 9/2005 | Hoerl .................... | G06F 3/0227 709/223 |
| 2015/0356045 A1* | 12/2015 | Soffer .................. | G06F 1/1632 710/303 |
| 2019/0028552 A1* | 1/2019 | Johnson, II ............. | H04L 67/02 |

* cited by examiner

*Primary Examiner* — Amit Chatly
(74) *Attorney, Agent, or Firm* — Kunzler Bean & Adamson (57) ABSTRACT

For wireless peripheral connection, a method establishes a plurality of wireless video connections between at least one computer and a breakout device. At least one of the plurality of wireless video connections is inactive. The method polls the at least one inactive wireless video connection within a specified time interval. The method maintains the at least one inactive wireless video connection in response to the polling.

17 Claims, 5 Drawing Sheets

WIRELESS PERIPHERAL CONNECTION

FIELD

The subject matter disclosed herein relates to peripherals and more particularly relates to wireless peripheral connection.

BACKGROUND

Computers, including multiple computers, often communicate with multiple peripherals.

BRIEF SUMMARY

A method for wireless peripheral connection is disclosed. The method establishes, by use of a processor, a plurality of wireless video connections between at least one computer and a breakout device. At least one of the plurality of wireless video connections is inactive. The method polls the at least one inactive wireless video connection within a specified time interval. The method maintains the at least one inactive wireless video connection in response to the polling. An apparatus and program product also perform the functions of the method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object-oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time. The embodiments may securely communicate encrypted data. The embodiments may organize data for efficient validation. In addition, the embodiments may validate the data in response to an action and/or a lack of an action.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or" indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
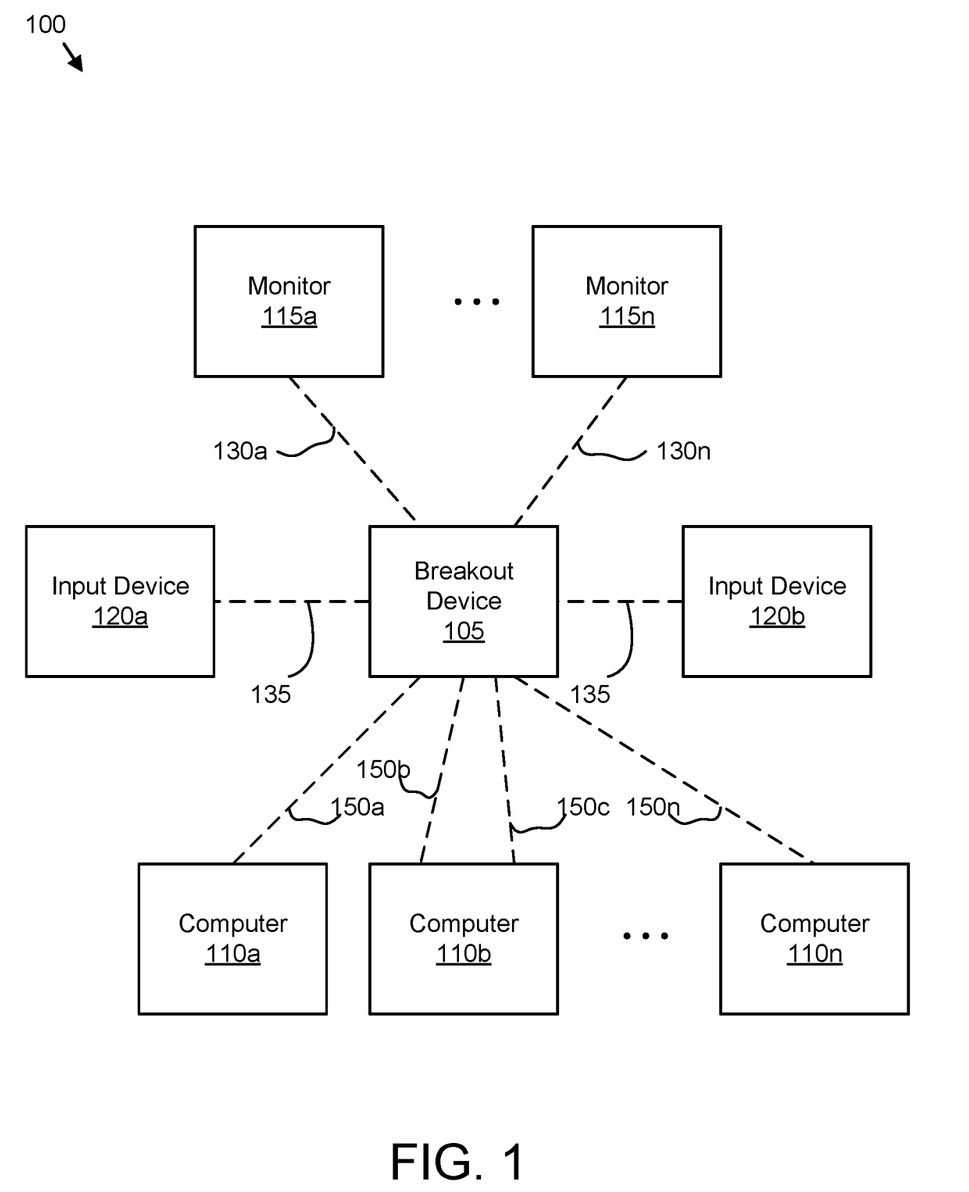
FIG. 1 is a schematic block diagram illustrating one embodiment of a computer system.

FIG. 1 is a schematic block diagram illustrating one embodiment of a computer system 100. In the depicted embodiment, a breakout device 105 provides peripherals for one or more computers 110. The computers 110 may be computer workstations, laptop computers, tablets, mobile telephones, virtual augmentation devices, and the like. The breakout device 105 may be is a keyboard, video, mouse (KVM) device.

Each computer 110 may communicate with the breakout device 105 via a wireless video connection 150. In one embodiment, the wireless video connection 150 supports a MIRACAST® protocol. The MIRACAST® protocol may be the latest protocol as of the filing date of the present application.

A plurality of input devices 120 may also communicate with the breakout device 105. The input devices 120 may be a mouse, a keyboard, a pointing device, a microphone, speaker, a video camera, and the like. The breakout device 105 may communicate with the input devices 120 via a peripheral connection 135. In one embodiment, the peripheral connection 135 is a Universal Serial Bus (USB) connection.

The breakout device 105 may present video information on one or more monitors 115 via a monitor connection 130. As used herein, video information refers to video images, still images, data, text, or combinations thereof. The monitor connection 130 may be a wireless connection. For example, the monitor connection 130 may also support the MIRACAST® protocol. In addition, the monitor connection 130 may be a wired connection. For example, the monitor connection 130 may be a High-Definition Multimedia Interface (HDMI) connection, a Video Graphics Array (VGA) connection, a Digital Visual Interface (DVI) connection, and the like.

In the past, only a single computer 110 communicated with the breakout device 105 via the wireless video connection 150 as computers 110 not communicating with the breakout device 105 wood timeout and/or cease communication. The embodiments establish a plurality of wireless video connections 150 between at least one computer 110 and the breakout device 105. At least one of the plurality of wireless video connections 150 is inactive. As used herein, inactive refers to not transmitting video information that is presented by a monitor 115. A wireless video connection 150 may transmit commands, status data, and the like and remain inactive if no video information is transmitted.

To maintain the at least one inactive wireless video connection 150, the embodiments poll the at least one inactive wireless video connection 150 within a specified time interval as will be described hereafter. As a result, the breakout device 105 maintains the plurality of wireless video connections 150 including the inactive wireless video connection 150 between at least one computer 110 and the breakout device 105, enhancing the functionality of the computer system 100.

Figure 2:
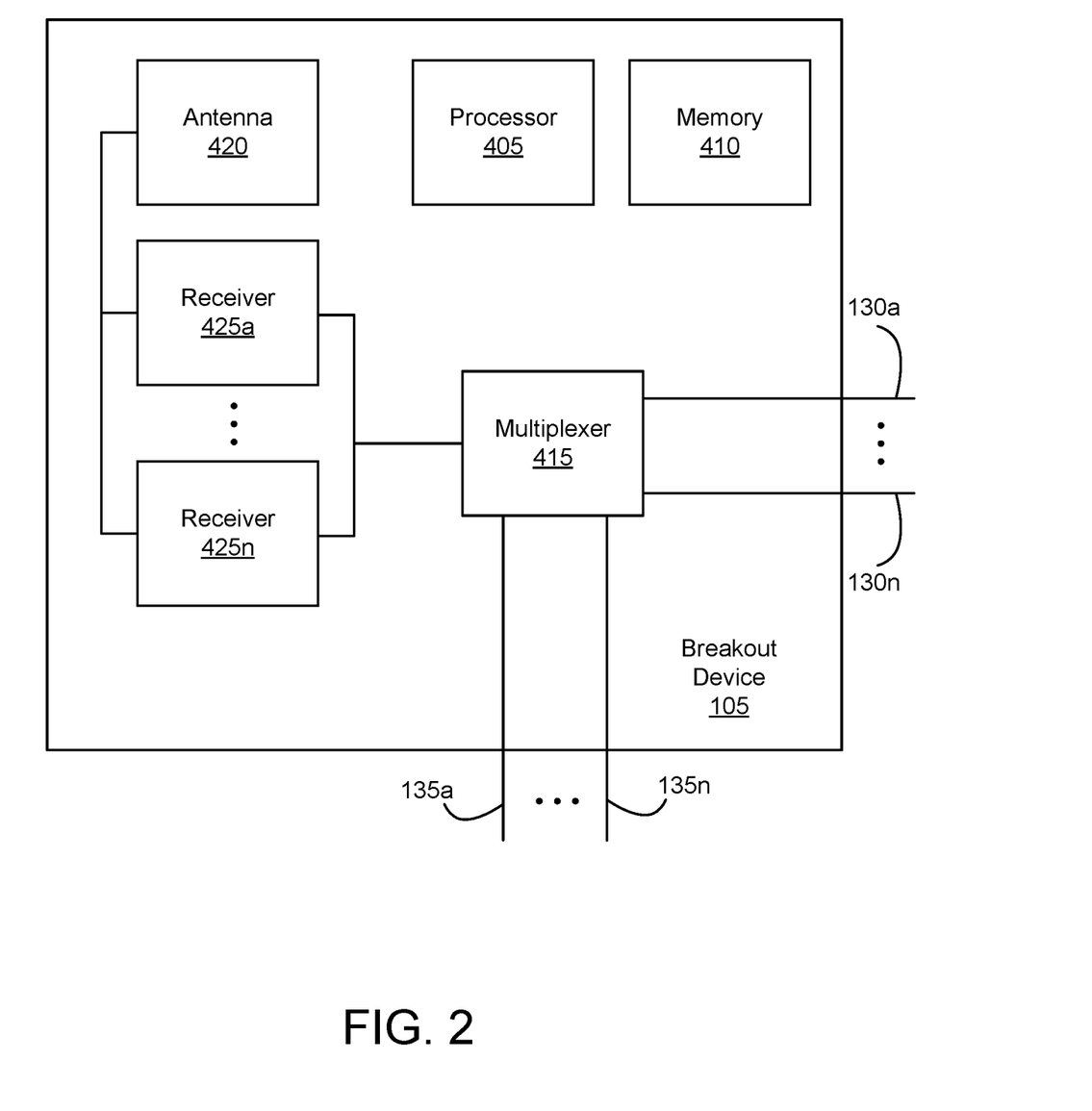
FIG. 2 is a schematic block diagram illustrating one embodiment of a breakout device.

FIG. 2 is a schematic block diagram illustrating one embodiment of the breakout device 105. In the depicted embodiment, the breakout device 105 includes a processor 405, memory 410, a multiplexer 415, an antenna 420, and a plurality of receivers 425. The memory 410 may store code and data. The processor 405 may execute the code and process the data.

The antenna 420 may facilitate communication via the wireless video connection 150 between the at least one computer 110 and a corresponding receiver 425.

One computer 110 may communicate with one receiver 425. In addition, one computer 410 may communicate with two or more receivers 425. In one embodiment, each computer 110 communicates with at least one receiver 425. The breakout device 105 may further communicate with the input devices 120 via the peripheral connection 135.

The multiplexer 415 may select video information from a receiver 425 and communicate the video information via at least one monitor connection 130 to at least one monitor 115. In addition, the multiplexer 415 may communicate information and/or commands from the peripheral connections 135 to a computer 110 and/or via the at least one video connection 132 at least one monitor 115.

Figure 3:
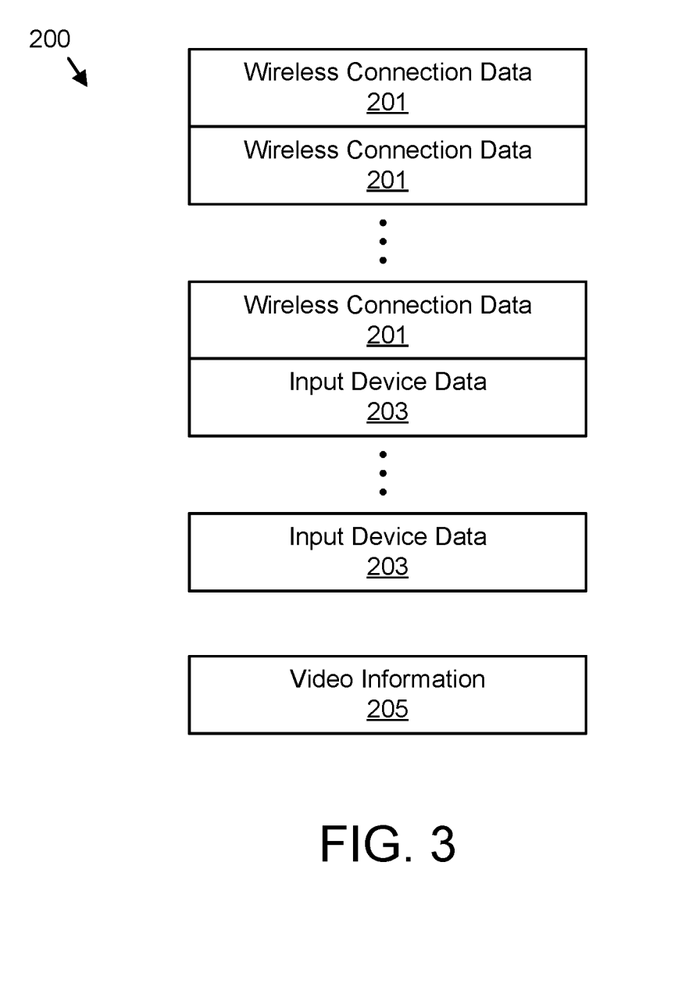
FIG. 3 is a schematic block diagram illustrating one embodiment of connection data.

FIG. 3 is a schematic block diagram illustrating one embodiment of connection data 200. The connection data 200 may be used to maintain wireless video connections 150. In addition, the connection data 200 may be used to communicate with input devices 120. The connection data 200 may be organized as a data structure in a memory. In the depicted embodiment, the connection data 200 includes a plurality of wireless connection data 201 and a plurality of input device data 203. The video information 205 is also shown.

The wireless connection data 201 manages and maintains a wireless video connection 150. The wireless connection data 201 may be used to maintain a wireless video connection 150 even if the wireless video connection 150 is inactive. The wireless connection data 201 is described in more detail in FIG. 4. The input device data 203 manages a peripheral connection 135 to an input device 120.

Figure 4:
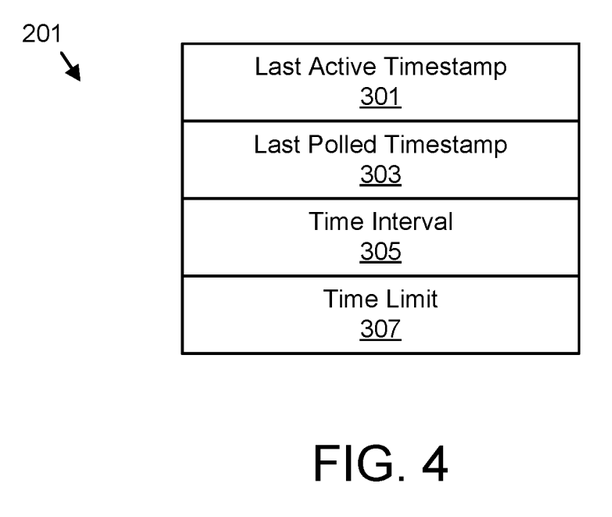
FIG. 4 is a schematic block diagram illustrating one embodiment of wireless connection data.

FIG. 4 is a schematic block diagram illustrating one embodiment of wireless connection data 201. The wireless connection data 201 includes a last active timestamp 301, a last polled timestamp 303, a time interval 305, and a time limit 307. Each instance of wireless connection data 201 may correspond to a given wireless video connection 150 and/or a given computer 110.

The last active timestamp 301 records the most recent time that the breakout device 105 communicated with a given computer 110 and/or communicated via a given wireless video connection 150. In one embodiment, the last active timestamp 310 is recorded each time the given computer 110 communicates via the given corresponding wireless video connection 150 with the breakout device 105. In a certain embodiment, the last active timestamp 301 is recorded each time the given computer 110 communicates via any wireless video connection 150 with the breakout device 105. In addition, the last active timestamp 301 may be recorded each time the any computer 110 communicates via the given wireless video connection 150 with the breakout device 105.

Each last polled timestamp 303 may correspond to the given wireless video connection 150. The last polled timestamp 303 may record the most recent time that the breakout device 105 polled the given wireless video connection 150.

The time interval 305 may specify a maximum elapsed time before an inactive wireless video connection 150 is polled. The time interval 305 may be specified. In addition, the time interval 305 may be determined from the last active timestamp 301, the last polled timestamp 303, the time limit 307, and/or a previous time interval 305.

In one embodiment, the time interval TI 305 is calculated using Equation 1, wherein TL is the time limit 307, t is a current time, AT is the last active timestamp 301, and PT is the last polled timestamp 303.

$$TI = TL - ((t - \min(AT, PT))/TL \quad \text{Equation 1}$$

The time limit 307 may specify a maximum elapsed time since a given wireless video connection 150 was active and/or polled. Wireless video connections 150 that were last active and/or polled prior to the time limit 307 may be determined to be inactive.

Figure 5:
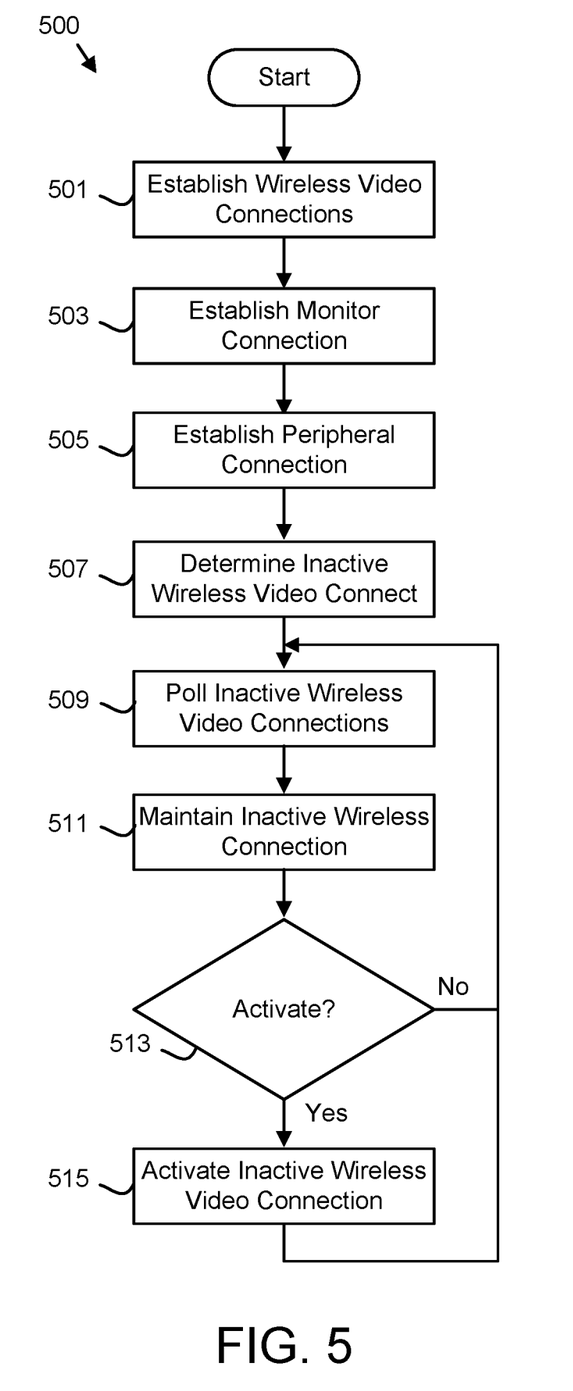
FIG. 5 is a schematic flow chart diagram illustrating one embodiment of a peripheral connection method.

FIG. 5 is a schematic flow chart diagram illustrating one embodiment of a peripheral connection method 500. The method 500 may maintain communications between a plurality of computers 110 and peripherals including monitors 115 and input devices 120. In addition, the method 500 may maintain a plurality of wireless video connections 150. The method 500 may be performed by the computer system 100, the breakout device 105, and/or the processor 405 of the breakout device 105.

The method 500 starts, and in one embodiment, the breakout device 105 establishes 501 a plurality of wireless video connections 150 with at least one computer 110. At least two wireless video connections 150 may be established 501. At least one of the plurality of wireless video connections 150 may be inactive.

The breakout device 105 further establishes 503 at least one monitor connection 130. The breakout device 105 may establish 503 monitor connections 130 with at least one monitor 115. A monitor connection 130 may be a wired connection. In addition, a monitor connection 130 may be a wireless connection.

The breakout device 105 may establish 505 at least one peripheral connection 135. A peripheral connection 135 may be a wired connection. In addition, a peripheral connection 135 may be a wireless connection.

The breakout device 105 may determine 507 an inactive wireless video connection 150. In one embodiment, a wireless video connection 150 is determined 507 to be inactive if the corresponding last active timestamp 301 is greater than the time limit 307. In addition, the wireless video connection 150 may be determined 507 to be inactive if the corresponding last polled timestamp 303 is greater than the time limit 307.

The breakout device 105 may poll 509 at least one inactive wireless connection 150. In one embodiment, the breakout device 105 polls 509 each inactive wireless connection 150. The breakout device 105 may poll 509 the inactive wireless connection 150 by requesting information. In addition, the breakout device 105 may poll 509 the inactive wireless connection 150 by issuing a command.

In one embodiment, the breakout device 105 polls 509 the at least one inactive wireless connection 150 within the specified time interval 305. The breakout device 105 may poll 509 the inactive wireless connection 150 within the time interval 305 from the last polled timestamp 303. In addition, the breakout device 105 may poll 509 the inactive wireless connection 150 within the time interval 305 from the last active timestamp 301.

The breakout device 105 may maintain 511 the at least one inactive wireless video connection 150 in response to polling 509 the at least one inactive wireless connection 150 within the time interval 305. The at least one inactive wireless video connection 150 may remain inactive and respond to commands from the breakout device 105.

In one embodiment, the breakout device 105 determines 513 whether to activate the at least one inactive wireless video connection 150. Breakout device 105 may determine 513 to activate the at least one inactive wireless connection 150 in response to a command from a computer 110 and/or command received directly by the breakout device 105.

If the breakout device 105 determines 513 not to activate the at least one inactive wireless video connection 150, the breakout device 105 continues to poll 509 the inactive wireless video connections 150. If the breakout device 105 determines 513 to activate an inactive wireless video connection 150, the breakout device 105 activates 515 that given inactive wireless video connection 150. Subsequently, the breakout device 105 polls 509 other inactive wireless video connections 150 but does not poll 509 the activated given wireless video connection 150.

The embodiments establish and maintain a plurality of wireless video connections 150 between at least one computer 110 and the breakout device 105. At least one of the plurality of wireless video connections 150 is inactive. As a result, if directed by a computer 110 and/or user, and an inactive wireless video connection 150 may be quickly and efficiently activated, improving the efficiency and efficacy of the computer system 100.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   establishing, by use of a processor, a plurality of wireless video connections between at least one computer and a breakout device, wherein at least one of the plurality of wireless video connections is inactive;
   polling the at least one inactive wireless video connection within a specified time interval, wherein the specified time interval TI is calculated as TI=TL−((t−min(AT, PT))/TL where TL is a maximum elapsed time since the at least one inactive wireless video connection was active, t is a current time, AT is a last active timestamp for the at least one inactive wireless video connection, and PT is a last polled timestamp for the at least one inactive wireless video connection; and
   maintaining the at least one inactive wireless video connection in response to the polling.

2. The method of claim 1, the method further comprising activating the inactive wireless video connection.

3. The method of claim 1, the method further comprising establishing a monitor connection.

4. The method of claim 1, the method further comprising establishing a peripheral connection.

5. The method of claim 1, wherein the wireless video connection supports a MIRACAST® protocol.

6. The method of claim 1, wherein the breakout device is a keyboard, video, mouse (KVM) device.

7. An apparatus comprising:
   a processor;
   a memory storing code executable by the processor to perform:
   establishing a plurality of wireless video connections between at least one computer and a breakout device, wherein at least one of the plurality of wireless video connections is inactive;
   polling the at least one inactive wireless video connection within a specified time interval, wherein the specified time interval TI is calculated as TI=TL−(t−min(AT, PT))/TL where TL is a maximum elapsed time since the at least one inactive wireless video connection was active, t is a current time, AT is a last active timestamp for the at least one inactive wireless video connection, and PT is a last polled timestamp for the at least one inactive wireless video connection; and
   maintaining the at least one inactive wireless video connection in response to the polling.

8. The apparatus of claim 7, the code further executable by the processor to perform activating the inactive wireless video connection.

9. The apparatus of claim 7, the code further executable by the processor to perform establishing a monitor connection.

10. The apparatus of claim 7, the code further executable by the processor to perform establishing a peripheral connection.

11. The apparatus of claim 7, wherein the wireless video connection supports a MIRACAST® protocol.

12. The apparatus of claim 7, wherein the breakout device is a keyboard, video, mouse (KVM) device.

13. A program product comprising a non-transitory computer readable storage medium that stores code executable by a processor, the executable code comprising code to perform:

establishing a plurality of wireless video connections between at least one computer and a breakout device, wherein at least one of the plurality of wireless video connections is inactive;

polling the at least one inactive wireless video connection within a specified time interval, wherein the specified time interval TI is calculated as $TI=TL-(t-\min(AT, PT))/TL$ where TL is a maximum elapsed time since the at least one inactive wireless video connection was active, t is a current time, AT is a last active timestamp for the at least one inactive wireless video connection, and PT is a last polled timestamp for the at least one inactive wireless video connection; and maintaining the at least one inactive wireless video connection in response to the polling.

14. The program product of claim 13, the code further executable by the processor to perform activating the inactive wireless video connection.

15. The program product of claim 13, the code further executable by the processor to perform establishing a monitor connection.

16. The program product of claim 13, the code further executable by the processor to perform establishing a peripheral connection.

17. The program product of claim 13, wherein the wireless video connection supports a MIRACAST® protocol.

* * * * *